May 4, 1937. E. M. PFAUSER Re. 20,350
HYDRAULIC JACK
Original Filed Dec. 20, 1930 3 Sheets-Sheet 1
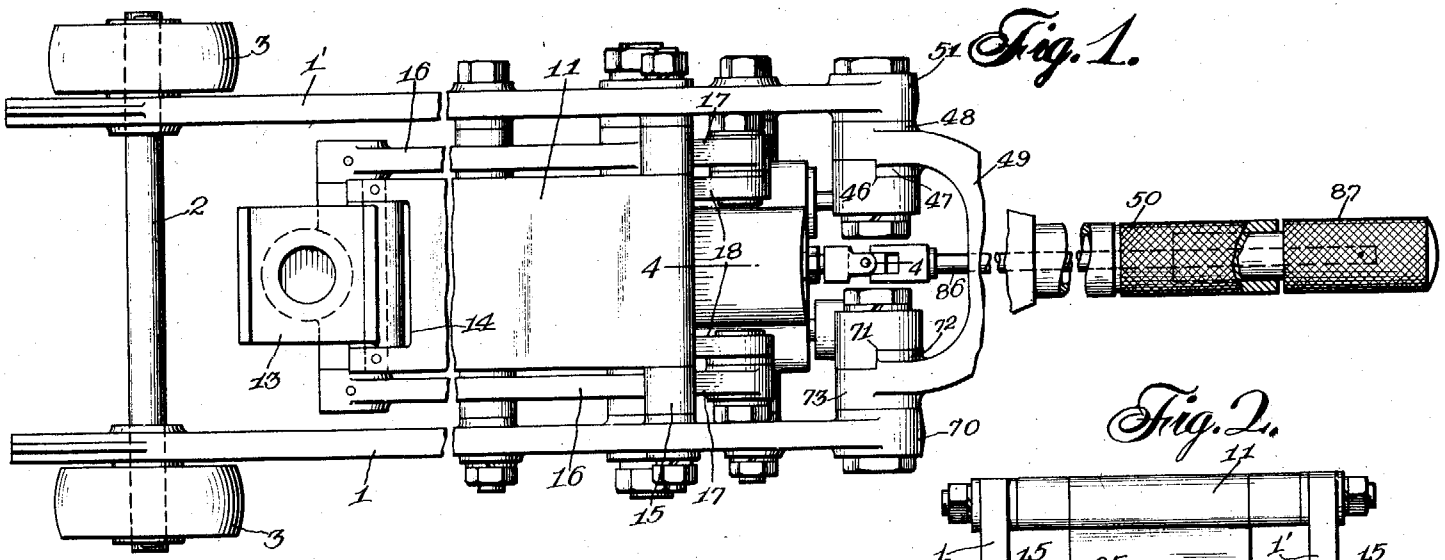
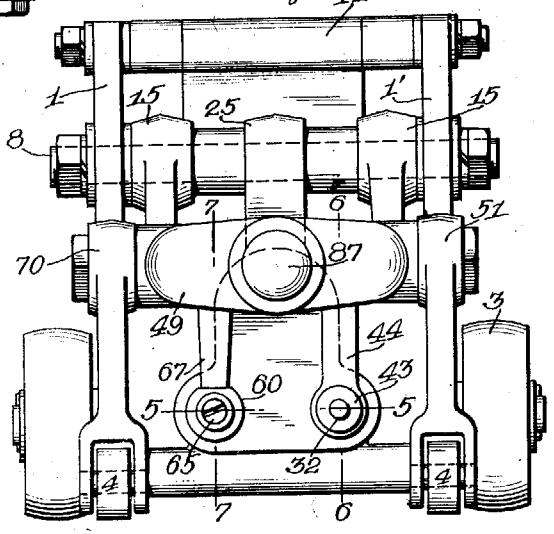
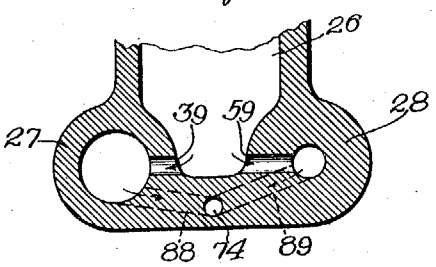
Inventor
Edward M. Pfauser
By
Brown, Jackson, Boettcher & Dienner Attorneys May 4, 1937. E. M. PFAUSER Re. 20,350

HYDRAULIC JACK

Original Filed Dec. 20, 1930 3 Sheets-Sheet 2

Inventor
Edward M. Pfauser

By Brown Jackson Boettcher Dienner
Attorneys

May 4, 1937. E. M. PFAUSER Re. 20,350

HYDRAULIC JACK

Original Filed Dec. 20, 1930 3 Sheets-Sheet 3

Inventor
Edward M. Pfauser

By Moore Jackson Gottlieb & Denner
Attorneys

Reissued May 4, 1937

Re. 20,350

UNITED STATES PATENT OFFICE 20,350

HYDRAULIC JACK

Edward M. Pfauser, Milwaukee, Wis., assignor to Blackhawk Mfg. Co., Milwaukee, Wis., a corporation of Wisconsin Original No. 1,873,473, dated August 23, 1932, Serial No. 503,739, December 20, 1930. Application for reissue November 13, 1933, Serial No. 697,867

14 Claims. (Cl. 254—2)

The present invention relates generally to lifting jacks and is particularly concerned with jacks used around garages, repair shops and the like, for raising one end of an automobile and supporting the same in elevated position. Obviously, however, such jacks have other uses. In its more specific aspects the present invention relates to an improvement in hydraulic jacks.

In the modern automobile the axles are quite low, due to the general trend toward providing a low center of gravity. In order to raise the automobile it is preferable, of course, to engage the axle, and the jack must be low enough to engage the same even when the tire is deflated and the axle, therefore, quite close to the ground. For this reason it is an object of the present invention to provide a jack having a frame which is relatively low at the front portion for entry under the axle of the vehicle, and which rises to a greater height at the rear portion thereof, providing a wedge-shaped structure wherein the operating mechanism can be disposed within the base of the wedge.

It is one of the principal objects of the present invention to provide a simple and rugged jack which will operate very rapidly under no load and will automatically slow down and develop the proper power for lifting when the load is encountered. The automatic slow down means is required because, due to the fast contacting speed, little power was available.

In its preferred embodiment, the jack of the present invention is a hydraulic jack, as previously stated. I provide the jack with a hydraulic ram and with a pair of pumps for actuating the ram. The pumps comprise a feed pump and a power pump, both of which are used when the ram is being actuated to bring the lifting head into engagement with the load and only one of which, the power pump, is used for the actual lifting operation. It is an object of the present invention to provide means for effecting an automatic changeover from the high speed operation to the low speed operation, without requiring any act on the part of the operator, other than the normal jack lifting actuation.

Another object of the present invention is the provision of a hydraulic jack mounted upon traction wheels whereby the same can be easily moved from place to place and supporting a hydraulic operated piston, a lifting head with means for operatively connecting the hydraulic piston with the lifting head, and means for raising the lifting head rapidly into engagement with the object to be raised and then automatically reducing the pumping of the fluid behind the hydraulic piston.

A further object of the present invention is the provision of a hydraulic jack including a supply reservoir for fluid, a hydraulic piston, means for pumping the fluid from the cylinder into the piston, together with means, manually controlled, whereby to return the fluid behind the piston to the reservoir.

A still further object of the invention is the provision of a hydraulic jack mounted upon a small traction frame, and provided with hand operated pumps arranged in substantially parallel relation, together with means whereby one of said pumps is automatically ineffective under a predetermined pressure.

With the above and other objects in view, the invention consists in the novel features of construction, the combination and arrangement of parts hereinafter more fully set forth, pointed out in the claims and shown in the accompanying drawings wherein:

Figure 1 is a top plan view illustrating a hydraulic jack constructed in accordance with my invention, with parts thereof broken away and shown in cross section;

Figure 2 is a rear end elevation;

Figure 8 is a section on the line 8—8 of Figure 5.

Figures 3, 4:
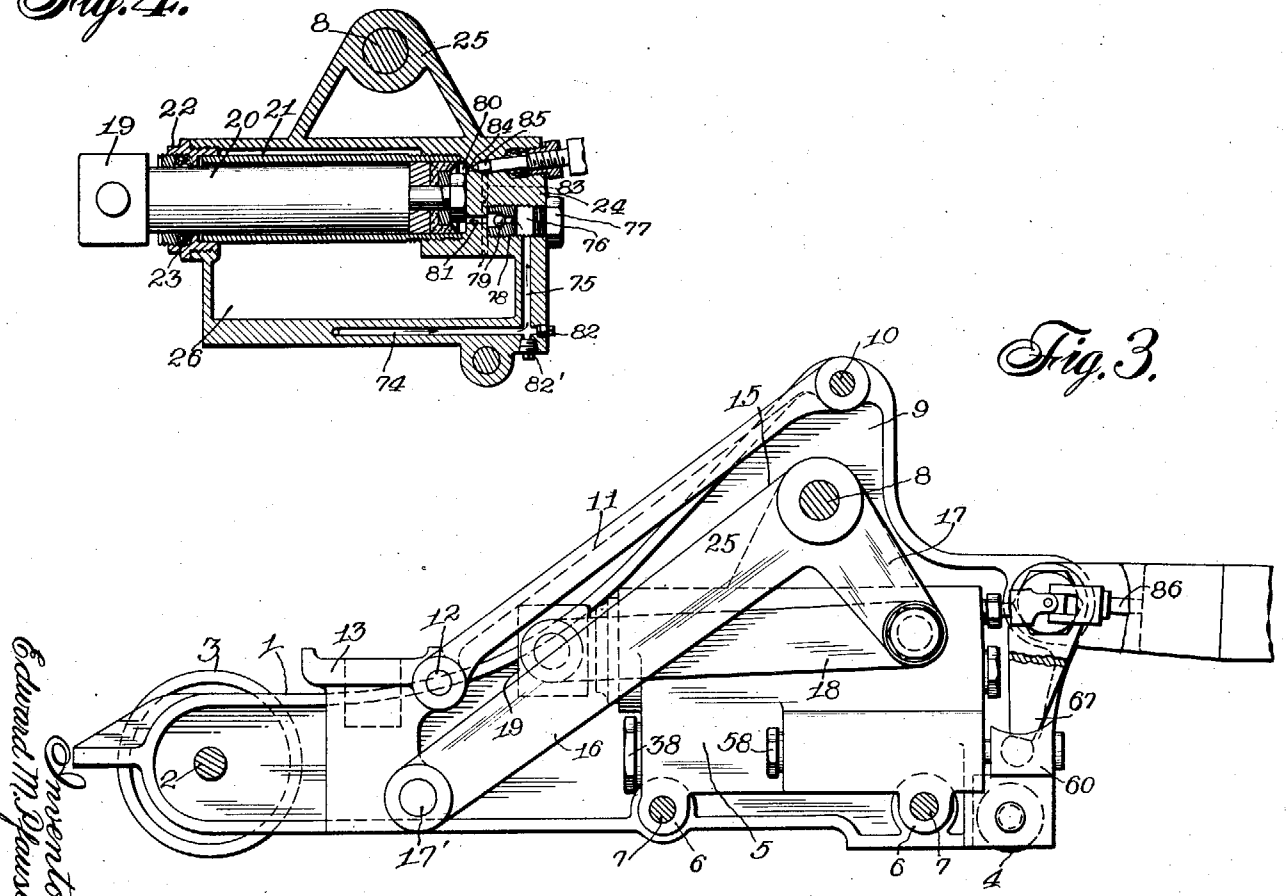
Figure 3 is a side elevation with parts thereof broken away and illustrated in cross section.
Figure 4 is a sectional view on the line 4—4 of Figure 1.
Figure 5:
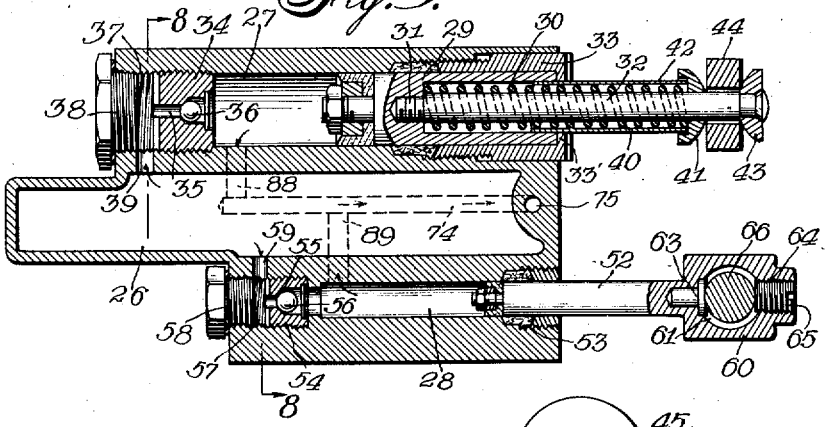
Figure 5 is a sectional view on the line 5—5 of Figure 2.
Figure 6:
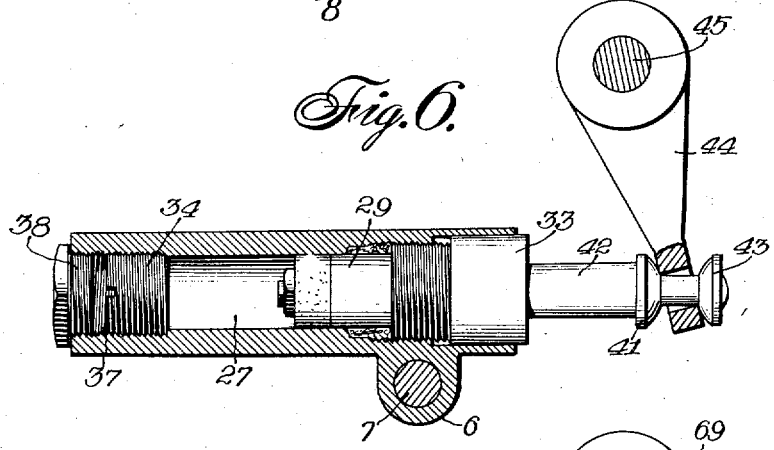
Figure 6 is a sectional view on the line 6—6 of Figure 2.
Figure 7:
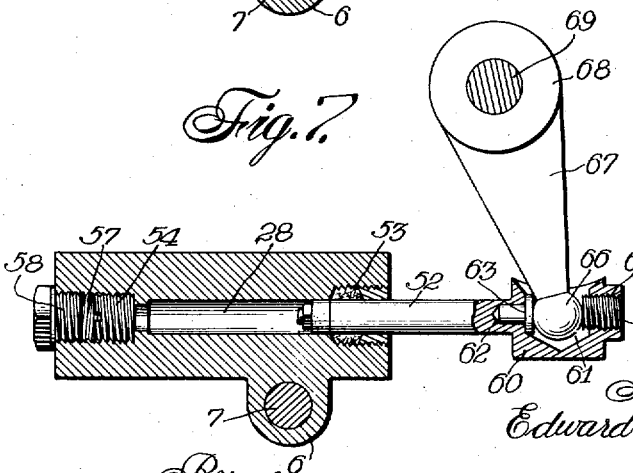
Figure 7 is a sectional view on the line 7—7 of Figure 2.

In the construction of my improved jack, I provide two side members 1 and 1' connected at their forward ends by means of a traction axle 2 upon the ends of which are mounted traction wheels 3. At the rear of the side members 1 and 1', I provide traction wheels 4. Arranged between the side members is the body 5 of the ram, provided at its lower side with apertured ears 6 mounted upon transverse bolts 7 which extend through the lower edges of the side members.

Extending transversely between the side members above the body of the ram, is a supporting shaft 8, and directly above the supporting shaft 8 and at the top of the raised portions 9 of the side members is a shaft 10 which supports a pivoted plate 11, pivotally connected at 12 to the lifting head 13 adjacent the upper end thereof. The angular extent of the plate 11 provides a relatively low forward end portion for the frame, whereby the lifting head 13 can be readily moved into position under the axle of the vehicle, while the raised rear portion serves as an enclosure for the operating mechanism comprising the pump and ram which is disposed below the pivot 8.

It will be noted that the plate 11 is cut out at its lower end as shown at 14 to provide spaced apertured ears to receive the pivot pin 12.

Arranged upon opposite sides of the plate 11 and rockably mounted upon the shaft 8 are bell cranks 15, each provided with a long arm 16 and a short arm 17. The long arms 16 normally extend downwardly on an angle, as shown in Figure 3 and are pivotally connected at 17' to the lifting head 13 adjacent the lower end thereof. The short arms 17 of the bell cranks are pivotally connected with the links 18 which are in turn pivotally attached to the head 19 on a ram piston 20. The piston 20 is mounted for reciprocating movement within a cylinder 21 mounted in the ram housing 5.

The ram housing 5 is provided with an opening at its forward end and removably mounted within this opening is a sleeve 22, the inner end of which supports one end of the cylinder 21, while the outer end supports suitable packing 23 to prevent leakage around the piston. The inner end of cylinder 21 is threaded into a block 24 within the ram housing, as shown in Figure 4.

At this point, I wish to call attention to the fact that the shaft 8 is supported at its central portion in a bearing 25 on the top of the ram housing, as shown in Figures 2 and 4.

Directly beneath the cylinder 21 is a fluid reservoir 26, and arranged upon each side of the reservoir 26 are the cylinders 27 and 28. Mounted for reciprocating movement in the cylinder 27 is a piston 29 having a central bore 30 with a threaded counter bore adapted to receive the reduced threaded end 31 of the rod 32. The piston 29 is provided at its removable end with suitable packing which is retained in place by means of a cap sleeve 33. The sleeve 33 has an internal circular flange 33' for limiting the outward movement of the piston 29. In the end of the cylinder 27 opposite the cap sleeve 33 is a block 34 provided with a central aperture 35 normally closed by means of a ball valve 36. The aperture 35 communicates with a chamber 37 within the cylinder 27 between the block 34 and the closure cap 38. The chamber 37 has direct communication with the fluid reservoir 26, through the passage 39.

Mounted upon rod 32 is a coil spring 40, the inner end of which bears against the inner end of the bore 30, while the outer end bears against a stop 41, which forms a closure for one end of the tube 42 which encloses the spring. Spaced from the closure 41 is a stop member 43 arranged at the outer end of rod 32. Loosely mounted upon the rod 32 between the stops 41 and 43 is the lower end of arm 44, mounted upon stub shaft 45. The head of the arm which is mounted on the shaft 45 is provided with a cut out portion 46 adapted to receive an offset part 47 on collar 48.

The collar 48 is carried by yoke 49 connected directly to handle 50. It will be noted in Figure 1 that the stub shaft 45 is supported in a suitable bearing 51 in the side member 1.

Mounted for reciprocating movement within the cylinder 28 is a piston 52 provided with suitable packing 53 at one end of the cylinder 28, and arranged within the other end of the cylinder is a removable block 54 having an aperture therethrough, as shown at 55, adapted to be closed against passage in one direction by means of a ball valve 56. The aperture 55 communicates with a chamber 57 between the closure plug 58 and block 54. The chamber 57 communicates with the reservoir 26 through passage 59.

The outer end of the piston 52 is provided with a head 60, recessed as shown at 61, and at one side of the recess, the head and a portion of the cylinder are provided with a bore 62 in which a headed pin 63 is mounted. The head 60 is provided directly opposite the bore 62 with a threaded aperture 64 and adjustably mounted in the threaded aperture 64 is an adjusting screw 65.

Arranged within the recess 61 and positioned between the head of the pin 63 and adjusting screw 65 is a rounded head 66 of a rockable arm 67. The arm 67 is provided at its upper end with a collar 68 mounted on stub shaft 69, which is in turn mounted in a bearing 70 carried by the side member 1. The collar 68 is provided with a cutout part 71 adapted to receive an offset portion 72 on collar 73, carried by the yoke 49. From this description, it will be apparent that pistons 29 and 52 will be operated simultaneously through actuation of the handle 50.

Formed in the bottom portion of the reservoir 26 is a conduit 74 which communicates with a similar conduit 75 in one end of the reservoir that leads into a chamber 76 in the block 24. The outer end of this chamber is closed by means of a screw plug 77. Arranged within the chamber 76 at its inner end is a block 78 having a passage therethrough closed against fluid in one direction by means of a ball valve 79. The inner end of chamber 76 communicates with an expansion chamber 80 at the end of cylinder 21, the passageway 81 forming communication between chambers 76 and 80.

A threaded plug 82 closes the outer end of conduit 74 and a similar plug 82' closes the lower end of conduit 75 whereby these conduits may be readily cleaned of foreign material by removing the plugs 82 and 82' respectively. Leading back into the reservoir 26 is a passageway 83 which extends through block 24 and communicates with chamber 80 by a lateral passage 84. A needle valve 85 is mounted in block 24 and connected up with rod 86 which extends through the handle 50. The outer end of the rod 86 carries a head 87 rotatable independent of the handle 50 whereby passage 84 may be opened and closed by the operator.

Communication between the cylinder 27 and conduit 74 is established by means of a lateral passage 88, and communication between the cylinder 28 and conduit 74 is established by means of a lateral passage 89. Thus, the fluid pumped from the reservoir 26 into either one of the cylinders 27 and 28 will be directed into the conduit 74 up through conduit 75 and into cylinder 21 for reciprocating the ram piston 20.

In the operation of my improved hydraulic jack, attention is directed to the fact that when it is desired to raise the lifting head 13, the valve 85 is closed and handle 50 is actuated to reciprocate pistons 29 and 52 simultaneously in their respective cylinders. The lifting head 13 being properly positioned under the object to be raised, will be rapidly lifted due to the fact that both pistons 29 and 52 will operate simultaneously until the head 13 engages the object, at which time the fluid pressure in front of piston 29 will overcome the tension of spring 40 and cause the closure stop 41 and tube 42 to reciprocate on rod 32 against the tension of the spring, thus leaving only piston 52, operating to pump the fluid from the reservoir to the cylinder 21 behind piston 20. As piston 20 moves outwardly, it rocks the bell cranks 15, the long arms of which will raise the lifting head 13; plate 11 holding the lifting head in proper position so that it will be raised in a vertical plane.

When it is desired to release the raised object, valve 85 is opened, permitting the fluid behind the piston 20 to return to the reservoir 26, through the passage 84 and passage 83, permitting the links 18 and the bell cranks 15, as well as head 13 to return to their normal inoperative positions, as shown in Figure 3.

It will be noted from the foregoing that one of the principal objects of this invention is the provision of a hydraulic jack including parallel pump members adapted to be simultaneously operated in the initial raising of the lifting head, but as soon as pressure is brought to bear upon the lifting head, one of the pumps will be automatically rendered ineffective.

Thus, the pressure will be continued by the operation of the smaller cylinder and piston, slowly raising the head in its operation. By providing such a construction, it will save considerable time in bringing the lifting head into contact with the object to be raised and effect a quicker operation of the jack.

By providing a jack of this character with suitable traction means, the same can be quickly moved about, and due to the lower position of the lifting head, the same can be inserted beneath an object very close to the surface on which the jack is mounted and even though the object to be lifted is disposed at a considerable height above the head, the head can be quickly raised into contact with the object through the actuation of both of the pumps, and the raising can be continued through the operation of one of the pumps. The construction of the jack is comparatively simple and it is believed that it can be manufactured and placed on the market at a very low cost.

In compliance with the requirements of the patent statutes I have herein shown and described a preferred embodiment of my invention. The invention is, however, not limited to the precise construction herein shown, the same being merely illustrative of the principles of the invention, and various changes in the precise construction of the jack may be made without departing from the spirit of the invention or the scope of the appended claims.

What I consider new and desire to secure by Letters Patent is:

1. In a vehicle lifting jack, a wheeled frame, a load engaging member movably mounted on the frame, a ram mounted on the frame operatively connected to said load engaging member, a pair of pump units for actuating the ram, each including a piston, a pair of transversely aligned stub shafts on the frame, an operating handle having a yoke on its inner end, the arms of the yoke being rockable on the stub shafts, a rockable lever on each shaft operated by the adjacent arm of the yoke, and means operatively connecting the levers independently of one another to a piston.

2. In a vehicle lifting jack, a wheeled frame, a movable load engaging member mounted on the frame, a ram mounted on the frame operatively connected to said load engaging member, a pair of pump units for actuating the ram, each including a piston, a pair of transversely aligned stub shafts on the frame, an operating handle having a yoke on its inner end with the arms thereof rockable on the stub shafts, a rockable lever on each stub shaft operated by the adjacent arm of the yoke, and means operatively connecting the levers independently of one another to a piston, one of said means rendering one pump unit ineffective when a predetermined pressure is created.

3. In a vehicle lifting jack, a wheeled frame, a load engaging member mounted on the frame, a ram mounted on the frame operatively connected to said load engaging member, a pair of pump units mounted upon the frame for actuating the ram, each of said pump units including a piston, a piston rod connected with one of said pistons, a spring on said piston rod, a collar arranged on the piston rod for sliding movement against the tension of said spring, a pair of transversely aligned stub shafts on the frame, an operating handle having a yoke on its inner end with the arms thereof rockably mounted on the stub shafts, a rockable lever on each stub shaft operated by the adjacent arm of the yoke, one of said levers being slidably mounted on the piston rod and engaging the sliding collar, and means operatively connecting the other lever to the piston.

4. In a power mechanism, a frame, a load engaging member mounted on the frame, a ram mounted on the frame operatively connected to said load engaging member, a pair of pump units for actuating the ram, each including a piston, a pair of transversely aligned stub shafts on the frame, an operating handle having a yoke on its inner end, the arms of the yoke being rockable on the stub shafts, a rockable lever on each shaft operated by the adjacent arm of the yoke, and means operatively connecting the levers independently of one another to a piston.

5. In a power mechanism, a base, a hydraulic ram mounted on the base, a pair of pump units for actuating the ram, each including a piston, a pair of transversely aligned stub shafts carried on the base, an operating handle having a yoke on its inner end, the arms of the yoke being journaled on the stub shafts, a rockable lever on each shaft actuated by the adjacent arm of the yoke, and means operatively connecting the levers independent of one another to a piston.

6. A portable jack comprising a traction frame relatively low at the front for entry under an automobile, a lifting arm pivoted to the frame and extending from its pivot towards the lower front portion of the frame, a lifting head carried by the lifting arm, a combined ram and pump structure mounted on the frame with its pump portion adjacent the rear of the frame and with its ram portion lying generally above said pump portion at the rear of the frame, said structure including a ram piston adjacent the rear of the frame and movable horizontally forward of the frame in its lifting movement, means connecting the ram piston with the lifting arm, including a link extending rearwardly in a generally horizontal direction from the forward end of the ram piston, said link being pivotally connected to the lifting arm adjacent the rear of the jack, a traction handle pivoted to the frame at the rear thereof for moving the frame, and an actuating connection between the handle and the pump structure for actuating the pump structure upon reciprocation of the handle.

7. A portable jack comprising a traction frame including a pair of side members relatively low at the front for entry under an automobile and of a greater height towards the rear, a lifting arm pivoted between the frame members adjacent the rear thereof and extending forward and downward when in its lowered position, a lifting head carried by the lifting arm, a combined ram and pump structure mounted between the side members of the frame with its ram and pump portions disposed in laterally spaced planes and both disposed adjacent the rear of the frame, a traction handle pivoted to the frame at the rear thereof adjacent said combined ram and pump structure and adjacent the pivot between the arm and frame for moving the frame from place to place, and an actuating connection between the handle and the pumping means for actuating the pumping means upon reciprocation of the handle.

8. A two speed portable hydraulic jack comprising a frame, a pair of reciprocating pumps mounted on the frame, a handle for moving the jack, said handle being pivotally mounted, a connection between the handle and the pumps for actuating the pumps by reciprocation of the handle, a fluid reservoir disposed between said pumps and arranged to deliver liquid thereto, a hydraulic ram disposed above said reservoir and arranged to discharge liquid into said reservoir, said ram receiving liquid from both pumps, and means responsive to the development of a predetermined pressure in the ram for rendering one of the pumps ineffective while permitting the continued operation of the ram by the other pump.

9. A portable jack comprising a traction frame relatively low at the front for entry under an automobile and of a greater height towards the rear, a bell crank pivoted to the frame adjacent the rear thereof and comprising a comparatively long lifting arm extending forward and downward when in its lowered position, and a comparatively short power arm extending downward and rearwardly when the lifting arm is in its lowered position, a pull link extending forward from the power arm underneath the pivot of said bell crank, and actuating means connected to and extending rearwardly from the forward end of the pull link, said actuating means including a hydraulic pump and ram arranged alongside one another and both deposed alongside said pull link underneath the pivot of said bell crank, the ram being adapted to pull the pull link forward and swing the lifting arm upwardly.

10. A portable jack comprising a traction frame relatively low at the front for entry under an automobile and of a greater height towards the rear, a pair of bell cranks pivoted to the frame adjacent the rear thereof at each side of the frame, each bell crank comprising a comparatively long lifting arm extending downward and forward substantially to the forward end of said frame when the bell crank is in its lowered position, and a comparatively short power arm extending downwardly and rearwardly at the rear of said frame when the lifting arm is in its lowered position, a substantially horizontal ram disposed between the sides of said frame, a pair of pull links extending forwardly from the power arm of said bell cranks and on opposite sides of said ram, and a pump for actuating the ram disposed alongside the same and adjacent one of said pull links.

11. A portable jack comprising a traction frame including a pair of side members relatively low at the front for entry under an automobile and of a greater height towards the rear, a combined ram and double pump structure mounted between the side members of the frame with its pump portion including a pair of pumps disposed adjacent the rear of the frame, said structure including a ram piston and said pumps including a speed pump of comparatively large capacity and a power pump of smaller capacity extending parallel to the ram structure and located horizontally to the outer side of the center thereof, a traction handle, shaft means pivoting said handle to the frame at the rear thereof, a pair of actuating connections driven by the handle for actuating both pumps upon reciprocation of the handle, and means for releasing the pressure in the ram to permit lowering of the lifting arm comprising a release valve, a rotatable rod disposed substantially coaxial with respect to said handle, and universal joint means clearing said handle shaft means for opening the release valve.

12. A portable jack comprising a traction frame including a pair of generally triangular wedge-shaped side members relatively low at the front for entry under an automobile and of a greater height towards the rear, a lifting arm pivoted between the frame members adjacent the rear thereof and extending forward and downward when in its lowered position alongside the upper edges of said wedge-shaped side frame members, a lifting head carried by the lifting arm, a combined ram and pump structure mounted between the base portions of said triangular wedge-shaped side frame members with the ram and pump portions of said structure and disposed in laterally spaced planes, a traction handle pivoted to the frame at the rear thereof adjacent said combined ram and pump structure and rearwardly of the pivot between said lifting arm and the frame for moving the latter from place to place, and an actuating connection between the handle and the pumping means for actuating the pumping means upon reciprocation of the handle.

13. A portable jack comprising a traction frame including a pair of side members relatively low at the front for entry under an automobile and of a greater height towards the rear, a combined ram and double pump structure mounted between the side members of the frame with its pump portion including a pair of pumps disposed adjacent the rear of the frame, said structure including a ram piston and said pumps including a speed pump of comparatively large capacity and a power pump of smaller capacity extending parallel to the ram structure and located horizontally to the outer side of the center thereof, a traction handle, shaft means pivoting said handle to the frame at the rear thereof, connecting means actuated by the handle for operating both pumps upon reciprocation of the handle, and means for releasing the pressure in the ram to permit lowering of the lifting arm comprising a release valve, a rotatable rod disposed substantially coaxial with respect to said handle, and universal joint means disposed substantially in the axis of said handle shaft means for accommodating pivotal movement of the handle.

14. A portable jack comprising a wedge-shaped frame relatively low at the front for entry under an automobile and of greater height towards the base portion of the wedge at the rear of the frame, a lifting arm pivotally mounted on said frame at the base portion thereof of greater height and adjacent the upper edge thereof, and a combined ram and pump structure disposed in the base of the wedge-shaped frame underneath the pivot of said lifting arm, said ram being movable horizontally and having tension means operatively engaging the lifting arm to rotate the same in a vertical direction.

EDWARD M. PFAUSER.